United States Patent
Uema

(10) Patent No.: US 11,164,009 B2
(45) Date of Patent: Nov. 2, 2021

(54) CONTROL METHOD OF CONTROL DEVICE, CONTROL DEVICE, AND DISPLAY DEVICE

(71) Applicant: SEIKO EPSON CORPORATION, Tokyo (JP)

(72) Inventor: Shinya Uema, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 86 days.

(21) Appl. No.: 16/716,582

(22) Filed: Dec. 17, 2019

(65) Prior Publication Data
US 2020/0193167 A1 Jun. 18, 2020

(30) Foreign Application Priority Data
Dec. 18, 2018 (JP) .............................. JP2018-236083

(51) Int. Cl.
*G06K 9/00* (2006.01)
*G06T 7/73* (2017.01)

(52) U.S. Cl.
CPC ..... *G06K 9/00778* (2013.01); *G06K 9/00664* (2013.01); *G06T 7/73* (2017.01); *G06T 2207/10048* (2013.01); *G06T 2207/30242* (2013.01)

(58) Field of Classification Search
CPC .. G06K 9/00778; G06K 9/00664; G06T 7/73; G06T 2207/30242; G06T 2207/10048

USPC .......................................................... 382/103
See application file for complete search history.

(56) References Cited

U.S. PATENT DOCUMENTS 9,066,315 B2 * 6/2015 Shimo .................... H04W 4/21
2016/0350615 A1 * 12/2016 Yano .................... G06K 9/209

FOREIGN PATENT DOCUMENTS

| JP | 2011-207303 A | 10/2011 |
| JP | 5464488 B2 * | 4/2014 |
| JP | 2017-204136 A | 11/2017 |

OTHER PUBLICATIONS

M. Berger and A. Armitage, "Room occupancy measurement using low-resolution infrared cameras," IET Irish Signals and Systems Conference (ISSC 2010), 2010, pp. 249-254, doi: 10.1049/cp.2010. 0521. (Year: 2010).*

Huang, Qian & Ge, Zhenhao & Lu, Chao. (2016). Occupancy Estimation in Smart Buildings using Audio-Processing Techniques. (Year: 2016).*

* cited by examiner

*Primary Examiner* — Ishrat I Sherali
(74) *Attorney, Agent, or Firm* — Oliff PLC

(57) ABSTRACT

A control method of the control device includes receiving state information representing a state of communication in a first area, determining an image corresponding to a degree of congestion with persons in the first area based on the state information, and making a display section display the image corresponding to the degree of the congestion with the persons.

17 Claims, 4 Drawing Sheets

CONTROL METHOD OF CONTROL DEVICE, CONTROL DEVICE, AND DISPLAY DEVICE

The present application is based on, and claims priority from JP Application Serial Number 2018-236083, filed Dec. 18, 2018, the disclosure of which is hereby incorporated by reference herein in its entirety.

BACKGROUND

1. Technical Field

The present disclosure relates to a control method of a control device, a control device, and a display device.

2. Related Art

In JP-A-2017-204136 (Document 1), there is described a people flow control system for changing a content to be displayed by a projector in accordance with a congestion situation in an area. The people flow control system detects the congestion situation in the area based on a taken image by a camera for imaging the people in the area, or based on the detection result of unique addresses of communication devices carried by the people.

In the people flow control system described in Document 1, in order to detect the congestion situation in the area, furthermore, in order to change the content related to the congestion situation in the area, it is necessary to use personal information requiring careful handling such as images of the people shown on the taken image by the camera or the unique addresses of the communication devices carried by the people.

SUMMARY

A control method of the control device according to an aspect of the present disclosure includes the steps of receiving state information representing a state of communication in a first area from a first measurement device which is disposed in the first area and is configured to measure the state of the communication, determining an image corresponding to a degree of congestion with persons in the first area based on the state information, and making a display section display the image corresponding to the degree of the congestion with the persons.

A control method of A control device according to an aspect of the present disclosure includes receiving first information depending on a degree of congestion with persons located in a first area without representing personal information of the persons, determining an image corresponding to the degree of the congestion with the persons based on the first information, and making a display section display the image corresponding to the degree of the congestion with the persons.

The control device according to an aspect of the present disclosure includes a reception section configured to receive state information representing a state of communication in a first area from a first measurement device which is disposed in the first area and is configured to measure the state of the communication, and a processing section configured to determine an image corresponding to a degree of congestion with persons in the first area based on the state information to make a display section display the image corresponding to the degree of the congestion with the persons.

DESCRIPTION OF AN EXEMPLARY EMBODIMENT

A: FIRST EMBODIMENT

A1: General Description of Display System A

Figure 1:
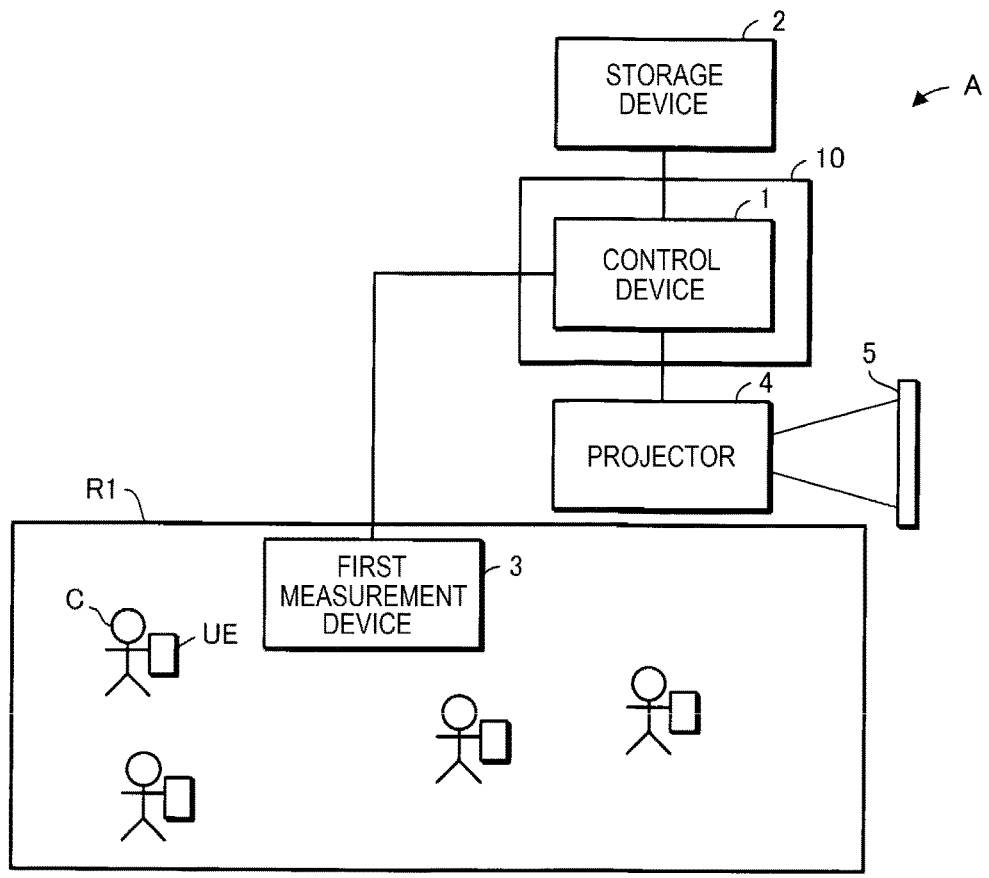
FIG. 1 is a diagram showing a display system A including a control device 1 according to a first embodiment.

FIG. 1 is a diagram showing a display system A including a control device 1 according to a first embodiment. The display system A includes an information processing device 10 including the control device 1, a storage device 2, a first measurement device 3, and a projector 4. The display system A displays an image on a projection surface 5.

The information processing device 10 is typically a personal computer (PC). It should be noted that the information processing device 10 is not limited to the PC, but can also be, for example, a dedicated information processing device. The information processing device 10 controls the display system A.

The storage device 2 is a recording medium detachably attached to the information processing device 10, and is, for example, a USB (universal serial bus) memory. USB is a registered trademark. It should be noted that the storage device 2 is not limited to the USB memory, but is only required to be a computer-readable recording medium. Further, the storage device 2 is not required to detachably be attached to the information processing device 10, but can also be incorporated in, for example, the information processing device 10. The storage device 2 stores image information representing an image to be displayed by the display system A.

The first measurement device 3 is disposed in a first area R1. The first measurement device 3 measures the intensity of a radio wave in a frequency band used in communication by a communication device UE located in the first area R1. The intensity of the radio wave measured by the first measurement device 3 is an example of a state of the communication in the first area R1. The first measurement device 3 transmits state information representing a value based on the intensity of the radio wave to the information processing device 10. In the present embodiment, the state information represents the value representing the intensity of the radio wave, and the higher the intensity of the radio wave is, the higher the value represented by the state information becomes.

The communication device UE is a portable communication device such as a smartphone. The communication device UE is carried by a person C located in the first area R1. Therefore, the larger the number of the persons C carrying the communication devices UE in the first area R1, the higher the degree of congestion with communication in the first area R1 becomes.

The communication devices UE communicate with other communication devices via a mobile telephone network including a base station and so on. In the communication via the mobile telephone network, namely mobile telephone communication, the intensity of the radio wave used in the communication varies by being adjusted in accordance with the degree of congestion with the communication. Specifically, the higher the degree of congestion with the communication in the first area R1 is, the weaker the intensity of the radio wave for transmission emitted by the communication device UE becomes.

Therefore, the higher the degree of congestion with the communication in the first area R1 is, namely the larger the number of the persons C carrying the communication devices UE in the first area R1 is, the weaker the intensity of the radio wave emitted by the communication device UE becomes, and the smaller the value represented by the state information becomes.

Therefore, the first measurement device 3 measures the intensity of the radio wave used in the communication by the communication device UE located in the first area R1 to thereby indirectly measure the degree of congestion with the persons C located in the first area R1, as a result.

The first area R1 is an area of a part of a facility where people gather such as a shopping mall. It should be noted that the facility including the first area R1 is not limited to the shopping mall, but can also be, for example, an airport, a station, or a store.

The projector 4 projects a variety of images on the projection surface 5 to thereby display the images on the projection surface 5. The projector 4 is an example of a display section and a display device.

The projection surface 5 is the ceiling in the first area R1. It should be noted that the projection surface 5 is not limited to the ceiling, but can also be, for example, a wall or a screen. In the present embodiment, the projection surface 5 is located at a position which can visually be recognized by the person C located in the first area R1. The projection surface 5 is an example of a display surface.

The control device 1 is, for example, a single control module. It should be noted that the control device 1 is not limited to the single control module, but can also be constituted by a plurality of control modules. The control device 1 controls the information processing device 10.

A2: Example of Control Device 1

Figure 2:
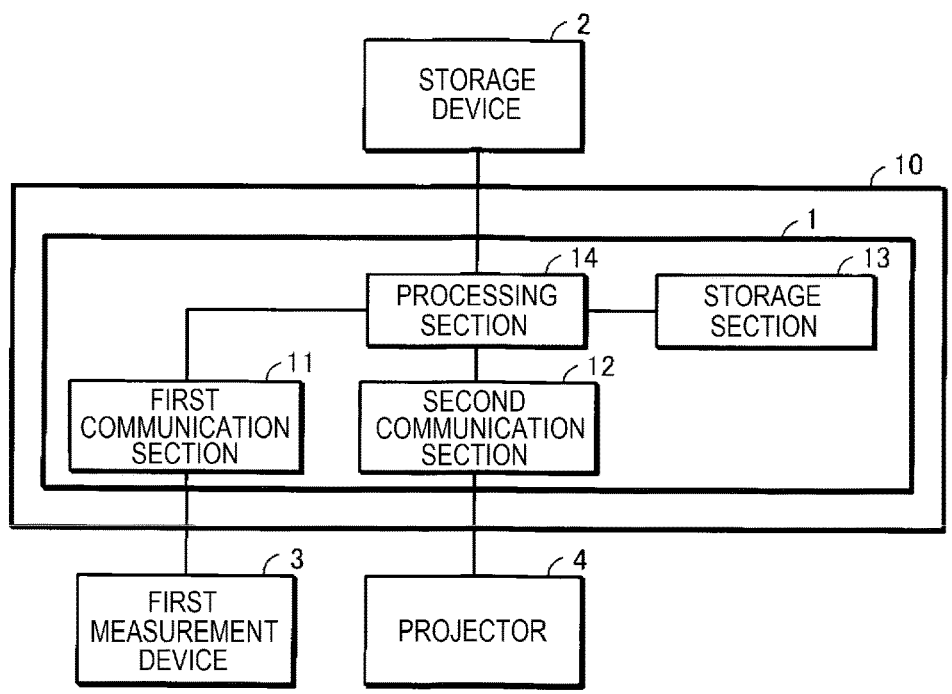
FIG. 2 is a diagram showing an example of the control device 1.

FIG. 2 is a diagram showing an example of the control device 1. The control device 1 includes a first communication section 11, a second communication section 12, a storage section 13, and a processing section 14.

The first communication section 11 communicates with the first measurement device 3 with wire or wirelessly. The first communication section 11 receives the state information from the first measurement device 3. The first communication section 11 is an example of a reception section for receiving the state information.

The second communication section 12 communicates with the projector 4 with wire or wirelessly. The second communication section 12 transmits first image information representing the non-congestion image G1, or second image information representing the congestion image G2 different from the non-congestion image G1 to the projector 4.

The non-congestion image G1 is an image used when the first area R1 is not congested with the persons C. The congestion image G2 is an image used when the first area R1 is congested with the persons C. Each of the non-congestion image G1 and the congestion image G2 is an example of an image corresponding to the degree of congestion with the persons C in the first area R1. The non-congestion image G1 is an example of a first image. The congestion image G2 is an example of a second image.

The storage section 13 is a computer readable recording medium. The storage section 13 stores a variety of types of information and a program for defining the operation of the processing section 14. It should be noted that the storage section 13 can also store the first image information and the second image information instead of the storage device 2.

The processing section 14 is a computer such as a central processing unit (CPU). The processing section 14 can also be formed of one processing device, or a plurality of processing devices. The processing section 14 retrieves and then executes the program stored in the storage section 13 to thereby perform a variety of operations.

The processing section 14 determines an image corresponding to the degree of the congestion with the persons C in the first area R1 based on the state information received by the first communication section 11. The processing section 14 makes the projector 4 display the image corresponding to the degree of the congestion with the persons C in the first area R1.

In the present embodiment, based on the magnitude relationship between the comparison value for determining whether the first area R1 is uncrowded or congested and the value represented by the state information, the processing section 14 determines the image corresponding to the degree of the congestion with the persons C in the first area R1, namely the image to be displayed on the projection surface 5 by the projector 4.

For example, when the value represented by the state information is larger than the comparison value, namely when the first area R1 is uncrowded, the processing section 14 makes the projector 4 display the non-congestion image G1 on the projection surface 5.

When the value represented by the state information is smaller than the comparison value, namely when the first area R1 is congested, the processing section 14 makes the projector 4 display the congestion image G2 on the projection surface 5.

When the value represented by the state information is equal to the comparison value, the processing section 14 makes the projector 4 display the congestion image G2 on the projection surface 5. It should be noted that when the value represented by the state information is equal to the comparison value, it is possible for the processing section 14 to make the projector 4 display the non-congestion image G1 instead of the congestion image G2 on the projection surface 5, or to make the projector 4 display an image G3 different from both of the non-congestion image G1 and the congestion image G2. As the image G3, it is possible to use, for example, a draft of the facility.

In the present embodiment, the comparison value is a fixed value, and is stored in the storage section 13. It should be noted that the comparison value can also be stored in the storage device 2 instead of the storage section 13.

A3: Example of Non-congestion Image G1 and Congestion Image G2

Figure 3:
FIG. 3 is a diagram showing an example of a non-congestion image G1.
Figure 4:
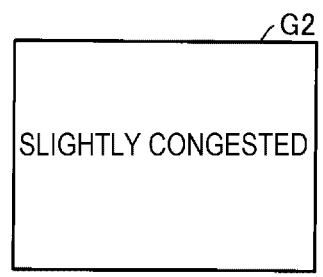
FIG. 4 is a diagram showing an example of a congestion image G2.

FIG. 3 is a diagram showing an example of the non-congestion image G1. FIG. 4 is a diagram showing an example of the congestion image G2. The non-congestion image G1 shows today's recommendations. Today's recommendations are, for example, today's recommended commodities. The congestion image G2 represents that the first area R1 is slightly congested. It should be noted that the non-congestion image G1 does not represent that the first area R1 is slightly congested to thereby represent that the degree of the congestion with the persons C in the first area R1 is not high.

The non-congestion image G1 and the congestion image G2 are not limited to the images described above, but can arbitrarily be changed. For example, it is also possible for the non-congestion image G1 to show a green color, and it is also possible for the congestion image G2 to show a red color.

A4: Example of Projector 4

Figure 5:
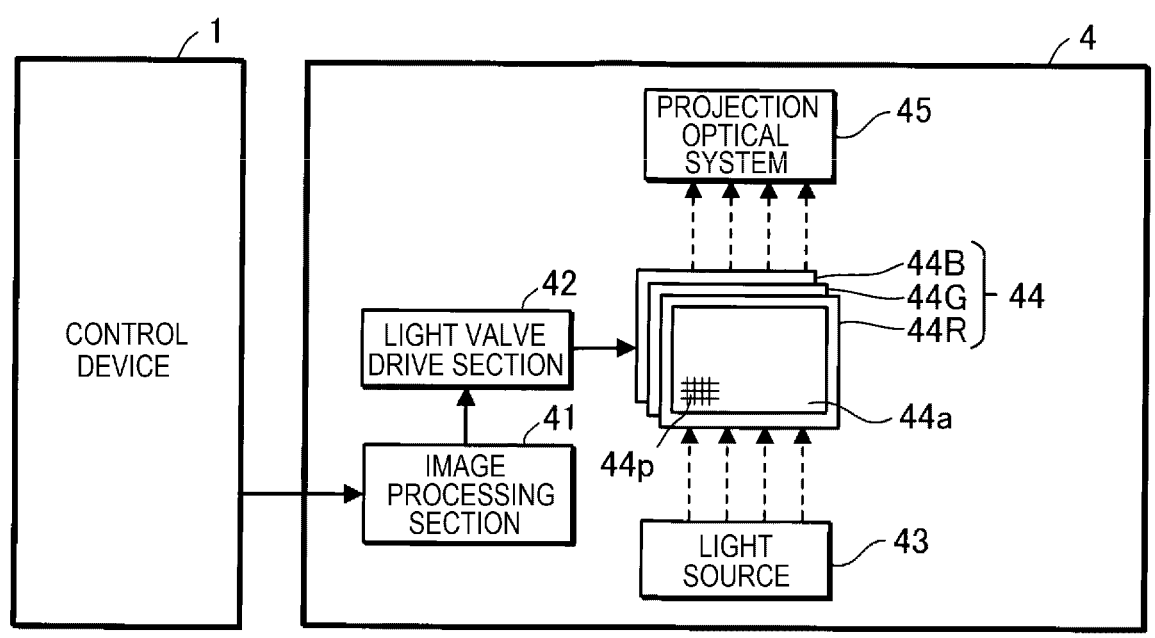
FIG. 5 is a diagram showing an example of a projector 4.

FIG. 5 is a diagram showing an example of the projector 4. The projector 4 includes an image processing section 41, a light valve drive section 42, a light source 43, a red-color liquid crystal light valve 44R, a green-color liquid crystal light valve 44G, a blue-color liquid crystal light valve 44B, and a projection optical system 45. Hereinafter, when there is no need to distinguish the red-color liquid crystal light valve 44R, the green-color liquid crystal light valve 44G, and the blue-color liquid crystal light valve 44B from each other, these are referred to as "liquid crystal light valves 44."

The image processing section 41 is a computer such as a CPU. The image processing section 41 can also be formed of one processing device, or a plurality of processing devices. The image processing section 41 performs image processing on image information to thereby generate an image signal. As the image information, there is cited, for example, each of the first image information and the second image information.

The image processing to be performed by the image processing section 41 includes, for example, a resolution conversion process. In the resolution conversion process, the image processing section 41 converts the resolution of the image information into, for example, the resolution of the liquid crystal light valves 44. It is also possible for the image processing section 41 to perform other image processing such as a so-called gamma correction process in addition to the resolution conversion process, or instead of the resolution conversion process.

The light valve drive section 42 drives the liquid crystal light valves 44 based on the image signal input from the image processing section 41.

The light source 43 is, for example, a light emitting diode (LED). It should be noted that the light source 43 is not limited to the LED, but can arbitrarily be changed, and can also be, for example, a xenon lamp, a super-high pressure mercury lamp, or a laser source. The light emitted from the light source 43 is reduced in variation in the brightness distribution by an integrator optical system not shown, and is then separated by a color separation optical system not shown into colored light components of red, green, and blue as the three primary colors of light. The red colored light component enters the red-color liquid crystal light valve 44R. The green colored light component enters the green-color liquid crystal light valve 44G. The blue colored light component enters the blue-color liquid crystal light valve 44B.

The liquid crystal light valves 44 are each formed of a liquid crystal panel having a liquid crystal material existing between a pair of transparent substrates, and so on. The liquid crystal light valves 44 each have a pixel area 44a having a rectangular shape and including a plurality of pixels 44p arranged in a matrix. In each of the liquid crystal light valves 44, a drive voltage is applied to the liquid crystal for each of the pixels 44p. When the light valve drive section 42 applies the drive voltages based on the image signal to the respective pixels 44p, each of the pixels 44p is set to the light transmittance based on the drive voltage. The light emitted from the light source 43 is modulated by passing through the pixel area 44a, and thus, the image based on the image signal is formed for each colored light. The liquid crystal light valves are an example of the light modulation device.

The images of the respective colors are combined by a color combining optical system not shown for each of the pixels 44p, and thus, a color image is generated. The color image is projected on the projection surface 5 by the projection optical system 45.

A5: Description of Operation

Figure 6:
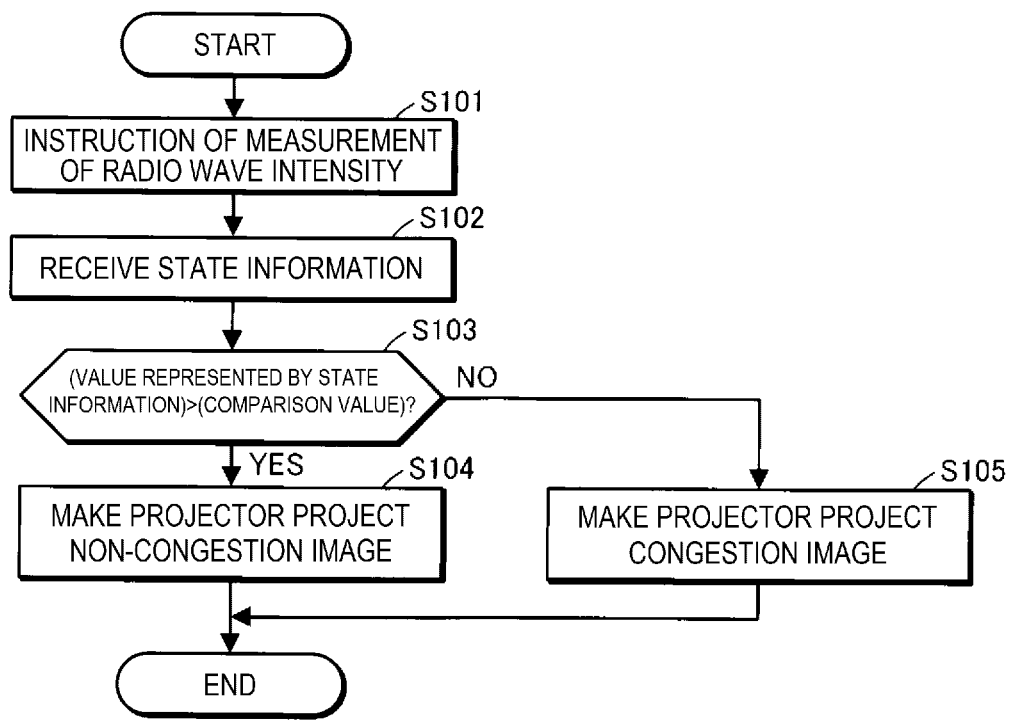
FIG. 6 is a flowchart for explaining an operation of the control device 1.

FIG. 6 is a flowchart for explaining an operation of the control device 1. The operation shown in FIG. 6 is performed periodically, for example, every 5 minutes. It should be noted that the time intervals at which FIG. 6 is performed are not limited to 5 minutes, but can arbitrarily be changed. Further, the operation shown in FIG. 6 can be performed in accordance with, for example, an instruction from the user.

In the step S101, the processing section 14 transmits an instruction of measurement from the first communication section 11 to the first measurement device 3. When the first measurement device 3 receives the instruction of measurement, the first measurement device 3 measures the intensity of a radio wave in a frequency band having a possibility of being used in the communication by the communication device UE. In the present embodiment, the frequency band having a possibility of being used in the communication by the communication device UE is the frequency band having a possibility of being used in the communication by the communication device UE in the mobile telephone communication, and is set in the processing section 14 in advance. Subsequently, the first measurement device 3 transmits the state information representing a value of the intensity of the radio wave to the first communication section 11.

Subsequently, when the first communication section receives the state information in the step S102, the processing section 14 determines whether or not the value represented by the state information is larger than the comparison value stored in the storage section 13 in the step S103.

When the value represented by the state information is larger than the comparison value, namely when the first area R1 is uncrowded, the processing section 14 retrieves the first image information from the storage device 2, and then transmits the first image information from the second communication section 12 to the projector 4 in the step S104. When the projector 4 receives the first image information, the projector 4 projects the non-congestion image G1 based on the first image information on the projection surface 5.

In contrast, when the value represented by the state information is equal to or smaller than the comparison value, namely when the first area R1 is uncrowded, the processing section 14 retrieves the second image information from the storage device 2, and then transmits the second image information from the second communication section 12 to the projector 4 in the step S105. When the projector 4 receives the second image information, the projector 4 projects the congestion image G2 based on the second image information on the projection surface 5.

According to the control device 1 related to the present embodiment and the control method of the control device 1, the processing section 14 determines the image to be displayed on the projection surface 5 by the projector 4, specifically, the image corresponding to the degree of the congestion with the persons C in the first area R1 based on the state information received from the first measurement device 3.

The communication devices UE located in the first area R1 communicate with other communication devices via a base station in order to perform the mobile telephone communication. Therefore, when the number of the communication devices UE located in the first area R1 increases, the number of the communication devices UE accommodated by the base station increases, and therefore, the state of the communication via the base station in the first area R1, for example, the intensity of the radio wave transmitted by the communication device UE in the first area R1 changes.

Here, since the communication devices UE are carried by the persons C located in the first area R1, the number of the communication devices UE located in the first area R1 depends on the number of the persons C carrying the communication devices UE in the first area R1.

Therefore, the state of the communication in the first area R1 is affected by the number of the persons C carrying the communication devices UE in the first area R1, namely the degree of the congestion with the persons C located in the first area R1, as a result.

Therefore, determining the image corresponding to the degree of the congestion with the persons C in the first area R1 based on the state information representing the state of the communication in the first area R1 means determining the image corresponding to the degree of the congestion with the persons C in the first area R1 based on the degree of the congestion with the persons C in the first area R1. Further, the state of the communication in the first area R1 does not represent personal information. Therefore, according to the present embodiment, it becomes possible to change the image corresponding to the degree of the congestion with the persons C in the first area R1, namely the image to be displayed on the projection surface 5 by the projector 4, without using the personal information requiring careful handling.

In the present embodiment, as the state of the communication, there is used the intensity of the radio wave in the frequency band used in the communication by the communication device UE. The intensity of the radio wave varies in accordance with the degree of the congestion with the communication in the first area R1. Therefore, it becomes possible to change the image related to the degree of the congestion with the persons C in the first area R1 using the information, namely the intensity of the radio wave, which is not the personal information.

In the present embodiment, the state information represents the value based on the state of the communication in the first area R1. The processing section 14 makes the projector 4 display the non-congestion image G1 on the projection surface when the value represented by the state information is larger than the comparison value, namely when the first area R1 is uncrowded, and the processing section 14 makes the projector 4 display the congestion image G2 on the projection surface 5 when the value represented by the state information is smaller than the comparison value, namely when the first area R1 is congested. Therefore, it is possible to change the image to be displayed on the projection surface 5 by the projector 4, namely the image corresponding to the degree of the congestion with the persons C in the first area R1, in accordance with the magnitude relationship between the value represented by the state information and the comparison value.

In the present embodiment, a fixed value is used as the comparison value. Therefore, the criterion used for switching between the non-congestion image G1 and the congestion image G2 can be made constant.

B: MODIFIED EXAMPLES

In the first embodiment, it is possible to adopt, for example, the configurations illustrated below.

B1: Modified Example 1

In the first embodiment, as the intensity of the radio wave, there can be used the intensity of the radio wave in the frequency band used in other communication performed by the communication device UE instead of the intensity of the radio wave in the frequency band used in the mobile telephone communication.

For example, when the communication device UE performs the Bluetooth communication and the Wi-Fi (Wireless Fidelity) communication, as the intensity of the radio wave, there can be used the intensity of the radio wave in the frequency band used in the Bluetooth communication, or the intensity of the radio wave in the frequency band used in the Wi-Fi communication. Bluetooth is a registered trademark. Wi-Fi is a registered trademark. It should be noted that the comparison value is required to arbitrarily be changed in accordance with the type of the communication such as the Bluetooth communication and the Wi-Fi communication.

It should be noted that in the communication such as the Bluetooth communication in which control of the transmission power, namely control of the intensity of the transmission radio wave, is not performed in the communication device UE, the larger the number of the communication devices UE located in the first area R1 is, the higher the intensity of the radio wave measured by the first measurement device 3 becomes.

Therefore, when the intensity of the radio wave in the frequency band used in the communication in which the intensity of the transmission radio wave is not controlled is used as the intensity of the radio wave, the higher the intensity of the radio wave is, the smaller the first measurement device 3 makes the value represented by the state information.

B2: Modified Example 2

In the first embodiment or Modified Example 1, as the state of the communication, it is possible to use a quality of the communication instead of the intensity of the radio wave used in the communication. It should be noted that in the present disclosure, it is assumed that the radio wave intensity is not included in the quality of the communication.

For example, when the first measurement device 3 communicates with other measurement devices using the mobile telephone communication, the quality in the communication between the first measurement device 3 and the other measurement devices via the base station is used as the state of the communication. The other measurement devices are located in, for example, the first area R1.

As the quality of the communication, there is used, for example, the communication speed or the communication delay time. It should be noted that the quality of the communication is not limited to the communication speed or the communication delay time.

When the communication speed is used as the quality of the communication, the higher the degree of the congestion with the communication is, the lower the communication speed becomes. Therefore, the lower the communication speed is, the smaller the first measurement device 3 makes the value represented by the state information.

Further, when the communication delay time is used as the quality of the communication, since the higher the degree of the congestion with the communication is, the longer the communication delay time becomes, the longer the communication delay time is, the smaller the first measurement device 3 makes the value represented by the state information.

It should be noted that when the other measurement devices are located in a second area R2 different from the first area R1, the quality of the communication measured by the first measurement device 3, specifically the quality of the communication when the first measurement device 3 communicates with the other measurement device via the base station, represents the communication quality in an area constituted by the first area R1 and the second area R2.

Further, it is also possible that still other measurement devices are disposed in a third area R3 different from the first area R1 and the second area R2, and the communication quality represented by the state information is identified based on the communication quality when the first measurement device 3 communicates with the other measurement devices, and the communication quality when the first measurement device 3 communicates with the still other measurement devices.

When, for example, the second area R2, the first area R1, and the third area R3 are arranged in this order, in the situation in which the communication is congested only in the second area R2, the quality of the communication between the first measurement device 3 located in the first area R1 and the other measurement device located in the second area R2 becomes low. In contrast, the quality of the communication between the first measurement device 3 located in the first area R1 and the still other measurement device located in the third area R3 does not become low.

In this case, the first measurement device 3 transmits the state information representing the quality of the communication between the first measurement device 3 and the still other measurement device to the information processing device 10. In other words, the first measurement device 3 located in the first area R1 transmits the state information representing the higher communication quality out of the communication quality when communicating with the other measurement device located in the second area R2, and the communication quality when communicating with the still other measurement device located in the third area R3 to the information processing device 10.

B3: Modified Example 3

In any of the first embodiment, Modified Example 1, and Modified Example 2, the comparison value can also be a value based on the state of the communication in the second area different from the first area R1.

Figure 7:
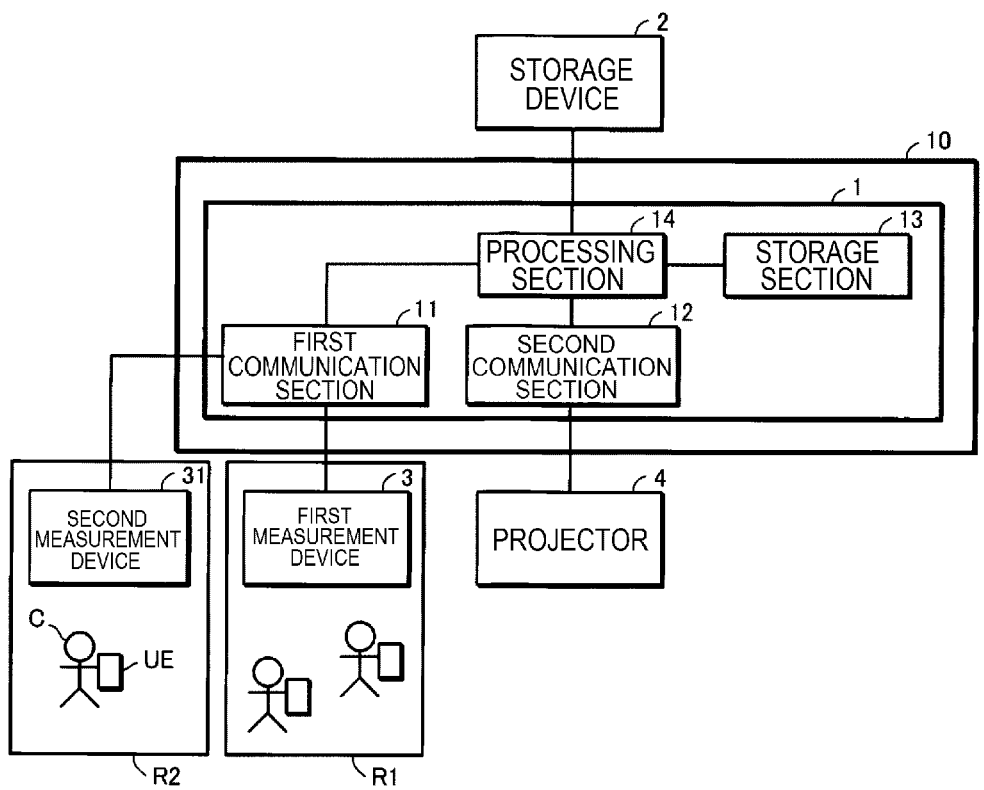
FIG. 7 is a diagram showing an example of Modified Example 3.

FIG. 7 is a diagram showing an example of Modified Example 3. In FIG. 7, a second measurement device 31 is disposed in the second area R2. The second measurement device 31 measures the intensity of a radio wave in the frequency band used in communication by the communication device UE located in the second area R2. The frequency band in which the intensity of the radio wave is measured by the second measurement device 31 is set to the frequency band in which the intensity of the radio wave is measured by the first measurement device 3. The intensity of the radio wave in the frequency band measured by the second measurement device 31 is an example of the state of the communication in the second area R2.

The second measurement device 31 transmits additional state information representing a value based on the intensity of the radio wave thus measured to the information processing device 10. The additional state information represents the value of the intensity of the radio wave in the frequency band measured by the second measurement device 31.

When the first communication section 11 of the information processing device 10 receives the additional state information from the second measurement device 31, the first communication section 11 provides the additional state information to the processing section 14. When the processing section 14 receives the additional state information, the processing section 14 uses the value represented by the additional state information as the comparative value.

Figure 8:
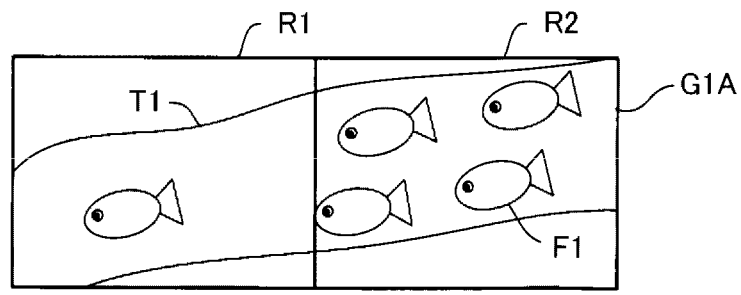
FIG. 8 is a diagram showing an image G1A.
Figure 9:
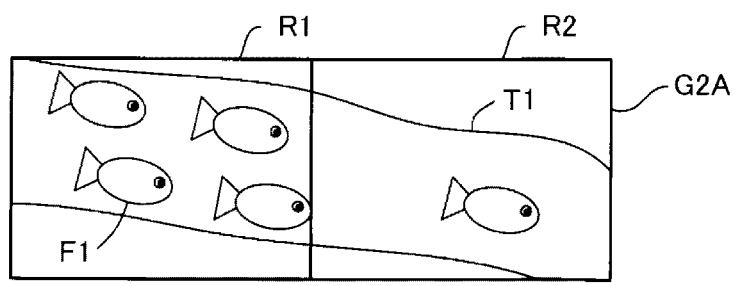
FIG. 9 is a diagram showing an image G2A.

In this case, it is also possible to use an image G1A shown in FIG. 8 as the non-congestion image G1, and to use an image G2A shown in FIG. 9 as the congestion image G2. The image G1A is an example of the first image, and the image G2A is an example of the second image.

The image G1A represents the fact that the second area R2 is more congested than the first area R1. Specifically, the image G1A shows a flow of a river T1, and represents the fact that the second area R2 is higher in the degree of the congestion with the persons than the first area R1 using a difference in degree of congestion with fishes F1 between the first area R1 and the second area R2, and at the same time represents the direction in which the persons C are desired to move using the direction of the fishes F1. In the image G1A, the direction of the fishes F1 is set to the direction in which the persons C are desired to move, specifically to the direction from the second area R2 toward the first area R1, so that the congestion in the second area R2 is resolved.

The image G2A represents the fact that the first area R1 is more congested than the second area R2. Specifically, the image G2A shows a flow of the river T1, and represents the fact that the first area R1 is higher in the degree of the congestion with the persons than the second area R2 using a difference in degree of congestion with the fishes F1 between the first area R1 and the second area R2, and at the same time represents the direction in which the persons C are desired to move using the direction of the fishes F1. In the image G2A, the direction of the fishes F1 is set to the direction in which the persons C are desired to move, specifically to the direction from the first area R1 toward the second area R2.

It should be noted that it is also possible to show the flow of the river T1 and the form of the fishes F1 swimming with a moving image such as animation in both or either one of the image G1A and the image G2A. Further, the display of the river T1 can be omitted, and it is also possible to use other organisms than a fish such as a frog instead of the fish F1, or to use so-called characters.

According to Modified Example 3, it is possible to change the image to be displayed on the projection surface 5 by the projector 4 in accordance with the magnitude relationship of the intensity of the radio wave between the first area R1 and the second area R2. Therefore, it is possible to change the image to be displayed on the projection surface 5 by the projector 4 based on the magnitude relationship of the degree of the congestion between the first area R1 and the second area R2 without using personal information.

It should be noted that in Modified Example 3, it is also possible to use such a quality of the communication as shown in Modified Example 2 as the state of the communication instead of the intensity of the radio wave.

B4: Modified Example 4

In any of the first embodiment, and Modified Example 1 through Modified Example 3, it is also possible for the processing section 14 to determine the image to be displayed on the projection surface 5 by the projector 4 based on information different from the state information instead of the state information.

Figure 10:
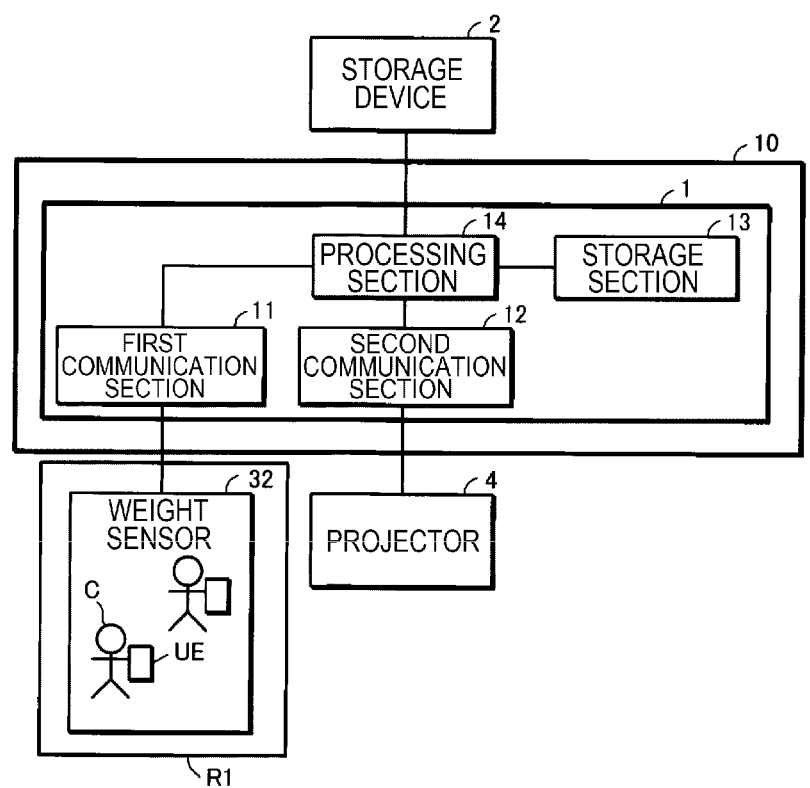
FIG. 10 is a diagram showing an example of Modified Example 4.

FIG. 10 is a diagram showing an example in which a detection result of a weight sensor 32 disposed in the first area R1 is used as the alternative information to the state information. Hereinafter, Modified Example 4 will be described with a focus on differences from the first embodiment shown in FIG. 2.

The weight sensor 32 is disposed in, for example, a passage for the persons in the first area R1. On the weight sensor 32, there are located the persons C located in the first area R1. The weight sensor 32 detects the weight applied to the weight sensor 32. The weight sensor 32 transmits the detection result of the weight applied to the weight sensor 32 to the first communication section 11. The detection result of the weight sensor 32 is an example of the first information. The detection result of the weight sensor 32 does not represent the personal information of the persons C located in the first area R1, and depends on the degree of the congestion with the persons C located in the first area R1.

In the present embodiment, the value represented by the detection result of the weight sensor 32 increases as the degree of the congestion with the persons C located in the first area R1 rises. Therefore, in Modified Example 4, a judgment that "(VALUE REPRESENTED BY FIRST INFORMATION)<(COMPARISON VALUE)?" is used in the step S103 shown in FIG. 6 instead of the judgment that "(VALUE REPRESENTED BY STATE INFORMATION)>(COMPARISON VALUE)?" It should be noted that when decreasing the value represented by the detection result of the weight sensor 32 as the degree of the congestion with the persons C located in the first area R1 rises, there is used a judgment that "(VALUE REPRESENTED BY FIRST INFORMATION)>(COMPARISON VALUE)?" in the step S103. In Modified Example 4, the comparison value is required to be changed to a value for Modified Example 4.

Also in Modified Example 4, it becomes possible to change the image related to the degree of the congestion with the persons C in the first area R1 without using the personal information requiring careful handling.

It should be noted that it is also possible to dispose an infrared sensor for detecting the number of the persons in the first area R1 instead of the weight sensor 32, and to use a detection result of the infrared sensor instead of the detection result of the weight sensor 32. The detection result of the infrared sensor is another example of the first information. The infrared sensor transmits the detection result of the infrared sensor to the first communication section 11. The detection result of the infrared sensor does not represent the personal information of the persons C located in the first area R1, and depends on the degree of the congestion with the persons C located in the first area R1. For example, the value represented by the detection result of the infrared sensor increases as the degree of the congestion with the persons C located in the first area R1 rises.

Further, it is also possible to dispose a temperature sensor for measuring the temperature in the first area R1 in the first area R1 instead of the weight sensor 32, and to use a detection result of the temperature sensor instead of the detection result of the weight sensor 32. The detection result of the temperature sensor is another example of the first information. The temperature sensor transmits the detection result of the temperature sensor to the first communication section 11. The detection result of the temperature sensor does not represent the personal information of the persons C located in the first area R1, and depends on the degree of the congestion with the persons C located in the first area R1. For example, the value represented by the detection result of the temperature sensor tends to increase as the degree of the congestion with the persons C located in the first area R1 rises.

Further, when an air conditioner is disposed in the first area R1, there is a tendency that the higher the degree of the congestion with the persons C located in the first area R1 is, the higher the air volume from the air conditioner becomes. Therefore, it is also possible to dispose an air flow meter for measuring the air volume in the first area R1 instead of the weight sensor 32, and to use a detection result of the air flow meter instead of the detection result of the weight sensor 32. The detection result of the air flow meter is another example of the first information. The air flowmeter transmits the detection result of the air flow meter to the first communication section 11. The detection result of the air flowmeter does not represent the personal information of the persons C located in the first area R1, and depends on the degree of the congestion with the persons C located in the first area R1.

Further, it is also possible to dispose a sound volume meter for measuring the sound volume in the first area R1 in the first area R1 instead of the weight sensor 32, and to use a detection result of the sound volume meter instead of the detection result of the weight sensor 32. The detection result of the sound volume meter is another example of the first information. The sound volume meter transmits the detection result of the sound volume meter to the first communication section 11. The detection result of the sound volume meter does not represent the personal information of the persons C located in the first area R1, and depends on the degree of the congestion with the persons C located in the first area R1. For example, the value represented by the detection result of the sound volume meter tends to increase as the degree of the congestion with the persons C located in the first area R1 rises.

Further, it is also possible to dispose a seismic intensity meter for measuring the seismic intensity in the first area R1 in the first area R1 instead of the weight sensor 32, and to use a detection result of the seismic intensity meter instead of the detection result of the weight sensor 32. The detection result of the seismic intensity meter is another example of the first information. The seismic intensity meter transmits the detection result of the seismic intensity meter to the first communication section 11. The detection result of the seismic intensity meter does not represent the personal information of the persons C located in the first area R1, and depends on the degree of the congestion with the persons C located in the first area R1. For example, the value represented by the detection result of the seismic intensity meter tends to increase as the degree of the congestion with the persons C located in the first area R1 rises.

B5: Modified Example 5

In any of the first embodiment, and Modified Example 1 through Modified Example 4, it is also possible for the processing section 14 to make the projector 4 alternately project the non-congestion image G1 and an image different from both of the non-congestion image G1 and the congestion image G2 in the step S104.

Further, it is also possible for the processing section 14 to make the projector 4 alternately project the congestion image G2 and an image different from both of the non-congestion image G1 and the congestion image G2 in the step S105.

As the image different from both of the non-congestion image G1 and the congestion image G2, there is used, for example, a draft of the whole of the facility including the first area R1. However, the image different from both of the non-congestion image G1 and the congestion image G2 is not limited to the draft of the whole of the facility including the first area R1, but can also be, for example, a landscape.

When using the draft of the whole of the facility as the image different from both of the non-congestion image G1 and the congestion image G2, it is also possible to incorporate the non-congestion image G1 in a part showing the first area R1 out of the draft of the whole of the facility in the step S104, and to incorporate the congestion image G2 in the part showing the first area R1 out of the draft of the whole of the facility in the step S105.

B6: Modified Example 6

In any of the first embodiment and Modified Example 1 through Modified Example 5, when the facility where the display system A is used is a commercial facility, it is possible that today's recommendations shown in the non-congestion image G1 represent today's bargains on sale in the first area R1, and the congestion image G2 does not show today's bargains on sale in the first area R1.

In this case, since today's bargains in the first area R1 are not shown in the situation in which the first area R1 is slightly congested, it becomes possible to prevent the first area R1 from becoming further congested by showing today's bargains in the first area R1 in the situation in which the first area R1 is slightly congested.

Further, in any of the first embodiment and Modified Example 1 through Modified Example 5, when the facility where the display system A is used is an airport, it is also possible to use an area including a check-in counter as the first area R1. In this case, it is also possible for the non-congestion image G1 and the congestion image G2 to further show either one or both of information of flight cancellation and guidance information of the airport.

B7: Modified Example 7

In any of the first embodiment and Modified Example 1 through Modified Example 6, it is also possible for the control device 1 to be incorporated in the projector 4.

B8: Modified Example 8

Although the liquid crystal light valves 44 are used as an example of the light modulation device, the light modulation device is not limited to the liquid crystal light valves, and can arbitrarily be changed. For example, it is also possible for the light modulation device to have a configuration using three reflective liquid crystal panels. Further, it is also possible for the light modulation device to have a configuration such as a system using a single liquid crystal panel, a system using three digital mirror devices (DMD), or a system using a single digital mirror device. In the case of using just one liquid crystal panel or DMD as the light modulating device, the members corresponding to the color separation optical system and the color combining optical system are unnecessary. Further, besides the liquid crystal panel or the DMD, any configurations capable of modulating the light emitted by the light source 43 can be adopted as the light modulation device.

B9: Modified Example 9

The display device is not limited to the projector 4, but can also be a direct-view type display such as a liquid crystal display.

B10: Modified Example 10

The function realized by the processing section 14 executing the program can also be realized by hardware using an electronic circuit such as a field programmable gate array (FPGA) or an application specific IC (ASIC). Further, it is also possible for the image processing section 41 to be realized by an electronic circuit such as an FPGA or an ASIC.

What is claimed is:

1. A control method of a control device, comprising:
receiving state information representing a state of communication in a first area from a first measurement device which is disposed in the first area and is configured to measure the state of the communication;
determining an image corresponding to a degree of congestion with persons in the first area based on the state information; and
making a display section display the image corresponding to the degree of the congestion with the persons,
wherein
the state of the communication is a speed of the communication.

2. The control method of the control device according to claim 1, wherein
the state of the communication is an intensity of a radio wave in a frequency band used in the communication.

3. The control method of the control device according to claim 1, wherein
the state information represents a value based on the state of the communication,
the display section is made to display a first image on a display surface when a value represented by the state information is larger than a comparison value, and
the display section is made to display a second image different from the first image on the display surface when the value represented by the state information is smaller than the comparison value.

4. The control method of the control device according to claim 3, wherein
the comparison value is a fixed value.

5. The control method of the control device according to claim 3, wherein
the comparison value is a value based on a state of communication in a second area different from the first area measured by a second measurement device disposed in the second area.

6. A control method of a control device, comprising:
receiving first information depending on a degree of congestion with persons located in a first area without representing personal information of the persons;
determining an image corresponding to the degree of the congestion with the persons based on the first information; and
making a display section display the image corresponding to the degree of the congestion with the persons, wherein
a weight sensor is disposed in the first area,
the weight sensor detects a weight applied to the weight sensor, and
the first information is a detection result of the weight sensor.

7. The control method of the control device according to claim 6, wherein
an infrared sensor configured to detect a number of persons is disposed in the first area, and
the first information is a detection result of the infrared sensor.

8. The control method of the control device according to claim 6, wherein
a temperature sensor configured to measure a temperature in the first area is disposed in the first area, and
the first information is a detection result of the temperature sensor.

9. The control method of the control device according to claim 6, wherein
an air flow meter configured to measure an air volume in the first area is disposed in the first area, and
the first information is a detection result of the air flow meter.

10. The control method of the control device according to claim 6, wherein
a sound volume meter configured to measure a sound volume in the first area is disposed in the first area, and
the first information is a detection result of the sound volume meter.

11. The control method of the control device according to claim 6, wherein
a seismic intensity meter configured to measure a seismic intensity in the first area is disposed in the first area, and
the first information is a detection result of the seismic intensity meter.

12. A control device comprising:
a reception section configured to receive state information representing a state of communication in a first area from a first measurement device which is disposed in the first area and is configured to measure the state of the communication; and
a processing section configured to determine an image corresponding to a degree of congestion with persons in the first area based on the state information to make a display section display the image corresponding to the degree of the congestion with the persons,
wherein
the state of the communication is a speed of the communication.

13. The control device according to claim 12, wherein
the state of the communication is an intensity of a radio wave in a frequency band used in the communication.

14. The control device according to claim 12, wherein
the state information represents a value based on the state of the communication,
the processing section makes the display section display a first image on a display surface when a value represented by the state information is larger than a comparison value, and
the processing section makes the display section display a second image different from the first image on the display surface when the value represented by the state information is smaller than the comparison value.

15. The control device according to claim 14, wherein
the comparison value is a fixed value.

16. The control device according to claim 14, wherein
the comparison value is a value based on a state of communication in a second area different from the first area measured by a second measurement device disposed in the second area.

17. A display device comprising:
the control device according to claim 12.

\* \* \* \* \*